(12) United States Patent
Grabbe

(10) Patent No.: US 7,006,738 B2
(45) Date of Patent: Feb. 28, 2006

(54) FIBER ARRAY FERRULE HAVING PRECISELY LOCATED PIN SLOTS AND RETENTION MEMBER SLOTS

(76) Inventor: Dimitry Grabbe, 2160 Rosedale Ave., Middletown, PA (US) 17057-3453

( * ) Notice: Subject to any disclaimer, the term of this patent is extended or adjusted under 35 U.S.C. 154(b) by 0 days.

(21) Appl. No.: 10/891,957

(22) Filed: Jul. 14, 2004

(65) Prior Publication Data

US 2004/0264874 A1    Dec. 30, 2004

Related U.S. Application Data

(63) Continuation of application No. 10/608,205, filed on Jun. 27, 2003, now Pat. No. 6,816,654.

(51) Int. Cl.
*G02B 6/42* (2006.01)
*G02B 6/38* (2006.01)
*G02B 6/00* (2006.01)

(52) U.S. Cl. .................... 385/52; 385/55; 385/136
(58) Field of Classification Search ................. 385/52, 385/55, 60, 80, 90, 78, 136, 137
See application file for complete search history.

(56) References Cited

U.S. PATENT DOCUMENTS

| | | |
|---|---|---|
| 3,864,018 A | 2/1975 | Miller |
| 4,101,198 A | 7/1978 | Heldt |
| 4,702,547 A | 10/1987 | Enochs |
| 4,752,109 A | 6/1988 | Gordon et al. |
| 4,818,058 A | 4/1989 | Bonanni |
| 4,865,413 A | 9/1989 | Hubner et al. |
| 5,037,179 A | 8/1991 | Bortolin et al. |
| 5,044,711 A | 9/1991 | Saito |
| 5,243,673 A | 9/1993 | Johnson et al. |
| 5,268,981 A | 12/1993 | Shahid |
| 5,280,558 A | 1/1994 | Wiener |
| 5,287,426 A | 2/1994 | Shahid |
| 5,377,289 A | 12/1994 | Johnson et al. |
| 5,379,361 A | 1/1995 | Maekawa et al. |

(Continued)

FOREIGN PATENT DOCUMENTS

EP    0410181 A2    1/1991

(Continued)

*Primary Examiner*—Chandrika Prasad
(74) *Attorney, Agent, or Firm*—Barley Snyder LLC

(57) ABSTRACT

The array ferrule of the present invention has a main body having a fiber receiving cavity which extends therethrough from a mating face to a rear end. A pair of pin slots is formed in opposing side walls of the main body being precisely located with respect to the fiber receiving cavity. In communication with each pin slot is a retention member slot for receiving a pin retention member. A plurality of fibers is precisely positioned within the fiber receiving cavity and an encapsulant substantially surrounds the fibers to substantially fill the fiber receiving cavity.

A method of making the array ferrule begins with providing a ferrule blank having a pair of preformed slots extending inward from the opposing side walls. The blank is precisely aligned on a mandrel which is placed within the fiber receiving cavity. Pin slots are broached in each side surface in the area of the preformed slots to form the ferrule main body. The ferrule main body is then positioned within a ferrule receiving opening of a central fixture such that locating pins of the central fixture are positioned within the pin slots. The fiber receiving cavity is then populated with a plurality of optical fibers which are accurately located using a plurality of combs over the ends of the optical fibers which protrude from the mating face. Finally, the fiber receiving cavity is filled with an encapsulant.

5 Claims, 8 Drawing Sheets

U.S. PATENT DOCUMENTS

| | | |
|---|---|---|
| 5,404,417 A | 4/1995 | Johnson et al. |
| 5,430,819 A | 7/1995 | Sizer, II et al. |
| 5,447,585 A | 9/1995 | Dannoux et al. |
| 5,483,611 A | 1/1996 | Basavanhally |
| 5,519,798 A | 5/1996 | Shahid et al. |
| 5,548,677 A | 8/1996 | Kakii et al. |
| 5,613,024 A | 3/1997 | Shahid |
| 5,742,720 A | 4/1998 | Kobayashi et al. |
| 5,843,611 A | 12/1998 | Sukata et al. |
| 6,045,270 A | 4/2000 | Weiss et al. |
| 6,259,856 B1 | 7/2001 | Shahid |
| 6,364,539 B1 | 4/2002 | Shahid |
| 6,386,767 B1 | 5/2002 | Naghski |
| 6,396,995 B1 | 5/2002 | Stuelpnagel et al. |
| 6,450,697 B1 | 9/2002 | Ngo |
| 6,470,123 B1 | 10/2002 | Sherman et al. |
| 6,474,878 B1 | 11/2002 | Demangone |
| 2002/0102080 A1 | 8/2002 | Olbricht et al. |
| 2002/0150349 A1 | 10/2002 | Shahid |
| 2003/0016918 A1 | 1/2003 | Grabbe |
| 2003/0044123 A1 | 3/2003 | Kiani et al. |

FOREIGN PATENT DOCUMENTS

| | | |
|---|---|---|
| EP | 0 423 497 B1 | 4/1991 |
| EP | 0 895 107 A1 | 2/1999 |
| EP | 1098213 A1 | 5/2001 |
| EP | 1 118 890 A2 | 7/2001 |
| EP | 1 146 368 A2 | 10/2001 |
| JP | 05134146 | 5/1993 |

FIBER ARRAY FERRULE HAVING PRECISELY LOCATED PIN SLOTS AND RETENTION MEMBER SLOTS

RELATED APPLICATION DATA

This is a continuation application of U.S. Ser. No. 10/608,205, filed Jun. 27, 2003, now U.S. Pat. No. 6,816,654.

FIELD OF THE INVENTION

The present invention relates to optical connectors and more particularly to an array ferrule and a method of making an array ferrule for use in such optical connectors.

BACKGROUND OF THE INVENTION

Communication systems have grown in complexity furthering the need for greater broadband capabilities. Optical communication systems have been employed in these communication systems and especially in broadband systems for meeting the need to transport large quantities of data, voice and other types of communications over a relatively compact network. Miniaturization of components in optical communication networks also continues to be necessary. Accordingly, multi fiber optical connectors such as the MT-RJ connector have become increasingly popular because of their ability to easily connect a plurality of fibers utilizing a standard form factor within the telecommunications industry. MT-RJ connectors have the capability of terminating a pair or a single row array of fibers utilizing a ferrule within the same connector housing that was previously used for a fiber pair termination.

One such connector has been developed by the MT-RJ Alliance including the companies of Hewlett-Packard, Fujikura, AMP, Siecor, and Usconec. The MT-RJ connector family utilizes an MT ferrule designed to hold 2, 4, 8, 12 or 16 fibers in a linear array. The MT ferrule is a precision molded solid part having tapered fiber receiving passageways which are loaded with a ribbon fiber array from a rear end. In line with the fiber array are a pair of pin receiving holes which are used to align the ferrule end faces of two mated ferrules. The pin holes must be precisely located with respect to the array of fiber receiving channels in order to insure proper alignment and to minimize optical signal attenuation between mated fiber end faces.

U.S. Patent Application Publication U.S. 2003/0016918 provides a multi fiber optical ferrule having a group of fibers terminated from a ribbon and arranged in a linear array. The ribbon is secured into the ferrule with epoxy introduced through a transverse window formed in the ferrule. Once the epoxy is cured, the fibers are cleaved and polished at the front end or mating face to complete the ferrule and fiber array assembly. The ferrule and fiber array assembly may then be loaded into a variety of connector housings which are part of the MT-RJ or other connector systems. Although that publication provides for a multi fiber optical ferrule having a group of fibers arranged in a linear array, it is desirable to increase the number of fibers which may be terminated by such an array ferrule. There is a need, however, to increase the density of fibers in the array while maintaining the same MT-RJ form factor and housing. It should be understood that this problem is not limited to the MT-RJ form factor, but that the need for high density extends to many fiber optic connector families. What is needed is a ferrule and method which is capable of increasing the density of fiber terminations within an existing optical connector housing.

SUMMARY OF THE INVENTION

The invention provides an array ferrule for use in a fiber optic connector. The array ferrule has a main body having a fiber receiving cavity which extends therethrough from a mating face to a rear end. Pin slots are formed in opposing side walls of the main body and are precisely located with respect to the fiber receiving cavity. In communication with each pin slot is a retention member slot for receiving a pin retention member. A plurality of fibers is precisely positioned within the fiber receiving cavity and an encapsulant substantially surrounds the fibers to substantially fill the fiber receiving cavity.

A method of making the array ferrule begins with providing a ferrule blank having a pair of preformed slots extending inward from the opposing side walls. The blank is precisely aligned on a mandrel which is placed within the fiber receiving cavity. Pin slots are broached in each side surface in the area of the preformed slots to form the ferrule main body. The ferrule main body is then positioned within a ferrule receiving opening of a central fixture such that locating pins of the central fixture are positioned within the pin slots. The fiber receiving cavity is then populated with a plurality of optical fibers which are accurately located using a plurality of combs over the ends of the optical fibers which protrude from the mating face. Finally, the fiber receiving cavity is filled with an encapsulant which is cured.

BRIEF DESCRIPTION OF THE DRAWINGS

The invention will now be described by way of example with reference to the accompanying figures of which.

DETAILED DESCRIPTION OF THE INVENTION

Figure 1:
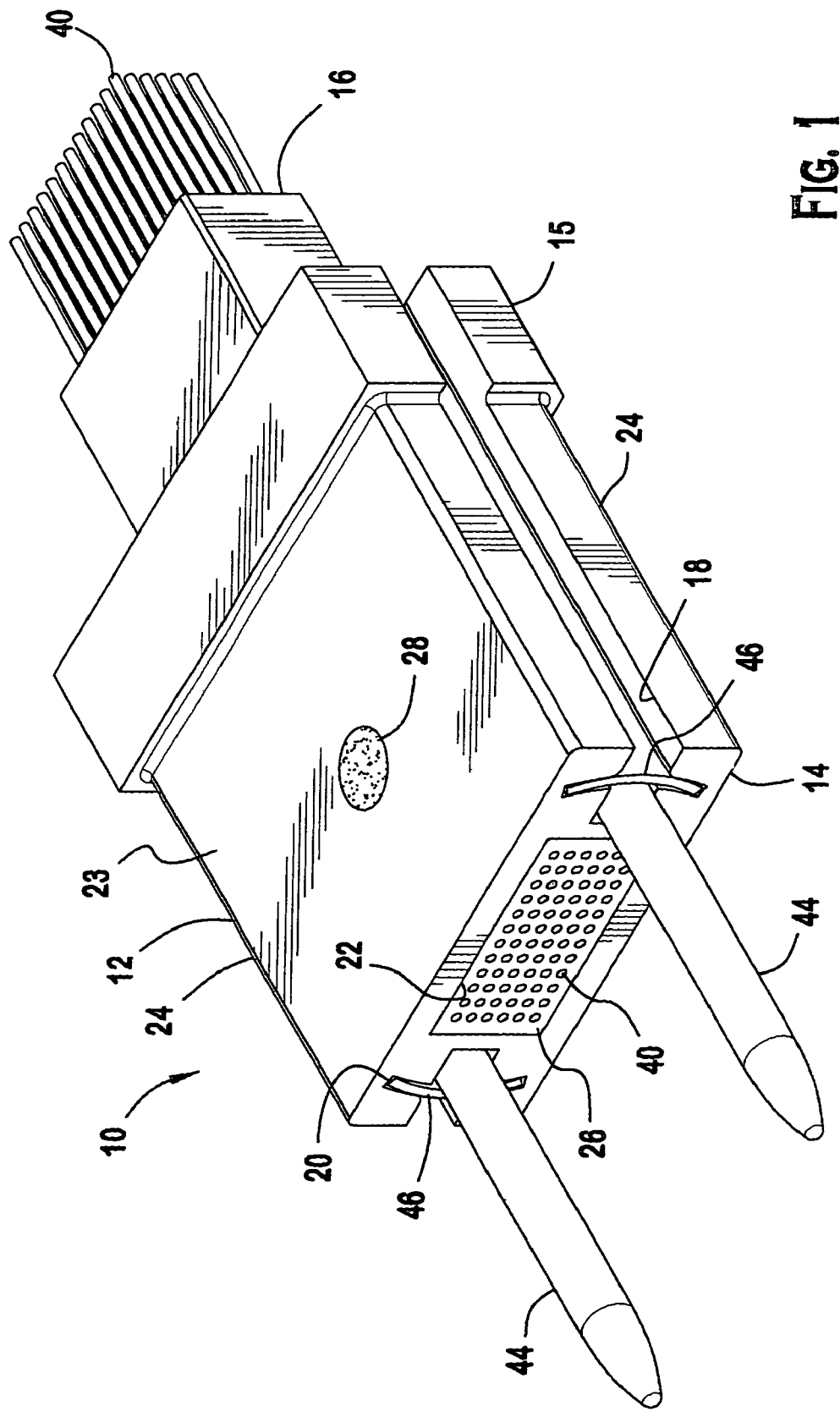
FIG. 1 is a perspective view of the array ferrule according to the present invention.

The optical array ferrule 10 will first be described generally with reference to FIG. 1. The major components of the array ferrule include a main body 12 which supports pins 44 within pin slots 18. Retention members 46 serve to hold the pins 44 within the pin slots 18. A plurality of optical fibers 40 are positioned within a fiber receiving cavity 22 by an encapsulant 26. The plurality of optical fibers 40 terminate along a mating face 14. Each of these major components will now be described in greater detail with reference to FIGS. 1 and 3.

Figure 3:
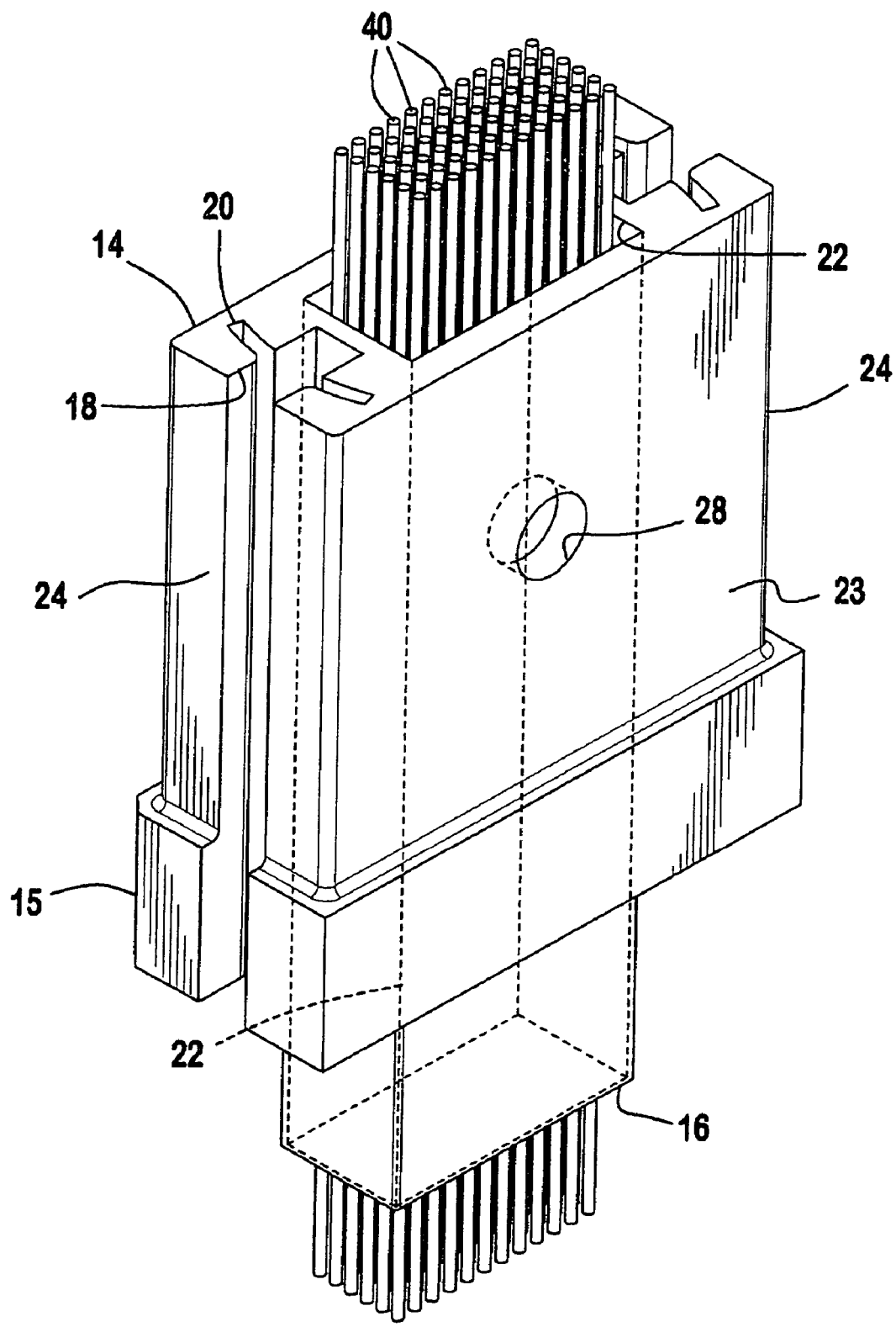
FIG. 3 is a perspective view of a partially assembled array ferrule of FIG. 1.

Referring first to FIG. 3, the main body 12 will be described in greater detail. The main body 12 is formed of a molded or cast material which exhibits dimensional stability suitable for temperature cycling of a given application. Various metallic compounds, plastics or other composites are suitable for forming the main body 12. For example suitable materials include but are not limited to: Z-2, Z-5, Z-7AL-60 63 or AL-60 61. A mating face 14 is formed on one end of the main body 12 and a rear end 16 is located opposite the mating face 14. A flange 15 is positioned near the rear end 16. A pair of opposing side surfaces 24 extend from the mating face 14 to the flange 15. A fiber receiving cavity 22 extends through the main body 12 between the side surfaces 24 from the mating face 14 back to the rear end 16. A pair of pin slots 18 are formed in the opposing side surfaces 24 and extend from the mating face 14 to the flange 15. The pin slots 18 are formed and located in precise relationship to the fiber receiving cavity 22. A retention member slot 20 extends rearward from the mating face 14 toward the flange 15 and is in communication with the pin slot 18.

A plurality of optical fibers 40 may be arranged either as a bundle or may emanate from a group of ribbon fibers to form an array which is located within the fiber receiving cavity 22 as shown in FIG. 1. The bundle of optical fibers 40 is terminated within the encapsulant 26 along the mating face 14 as will be described below. The mating face 14 is thereafter processed by cleaving the optical fibers 40 and polishing the mating face 14 by well known techniques as will be described below.

Figure 2:
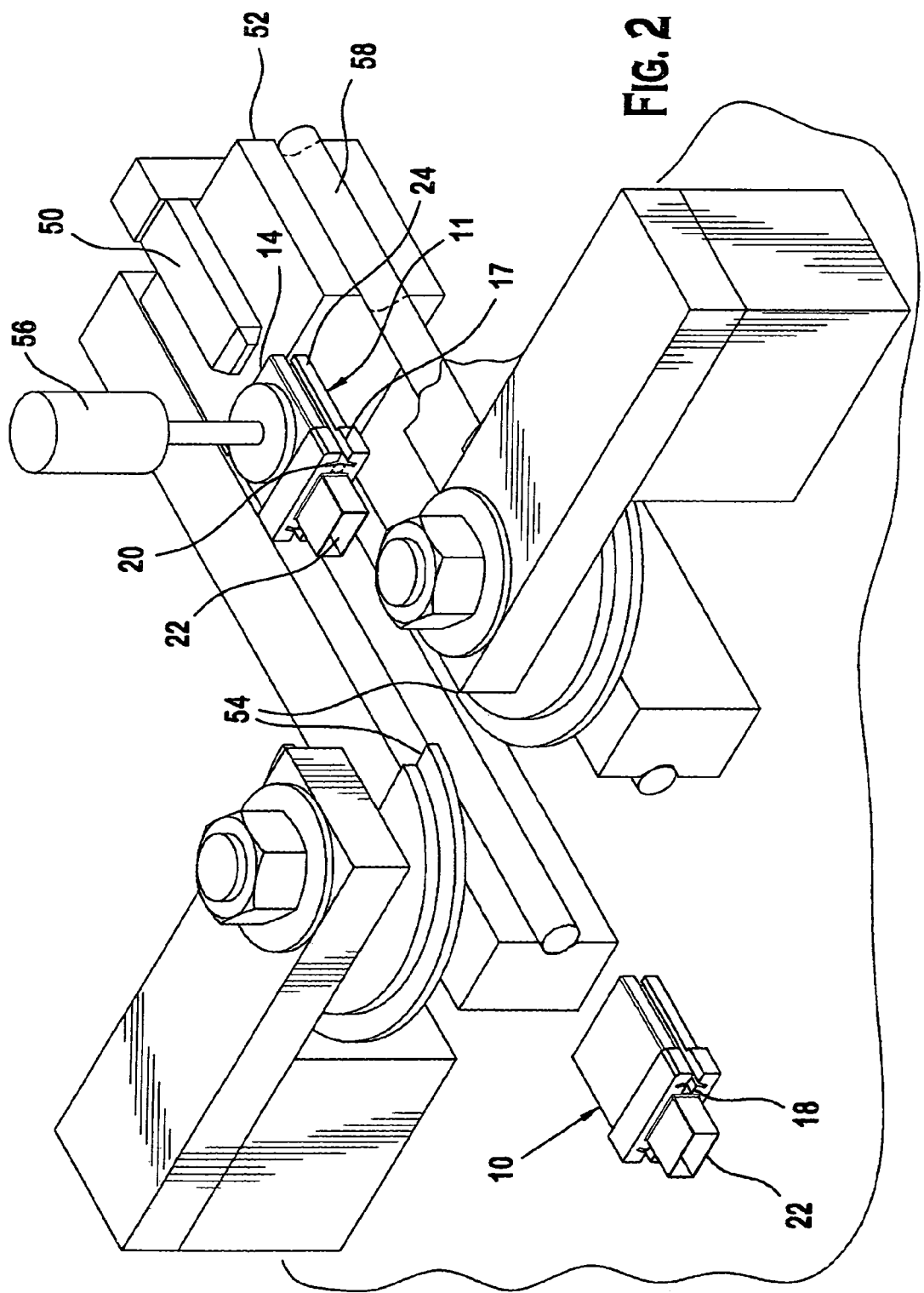
FIG. 2 is a perspective view of a ferrule blank positioned within a broach for broaching the pin slots.

A method of making the array ferrule 10 will now be described in greater detail with reference to FIGS. 2–10. Referring first to FIG. 2, a blank 11 of the array ferrule 10 is formed by either molding or casting. It should be noted here that the blank 11 is formed to have preformed slots 17 extending inward from the opposing side surfaces 24. Each preformed slot 17 extends inward only to the respective retention member slot 20. The blank 11 is held by a holding device 56 and is slid over a mandrel 50 such that the mandrel is received within the fiber receiving cavity 22 from the mating face 14. The mandrel 50 is tapered to precisely position the blank 11. The mandrel 50 is mounted on a carrier 52 which is slidable over rails 58 toward a pair of broaches 54 which are precisely located with respect to the mandrel 50. As the carrier 52 is slid past the broaches 54, precise pin receiving slots 18 are cut from the preformed slots 17. The resulting array ferrule main body 12 has a pair of pin receiving slots 18 precisely located with respect to the fiber receiving cavity 22. The main body 12 is now ready for further assembly to produce the completed array ferrule 10.

Figure 4:
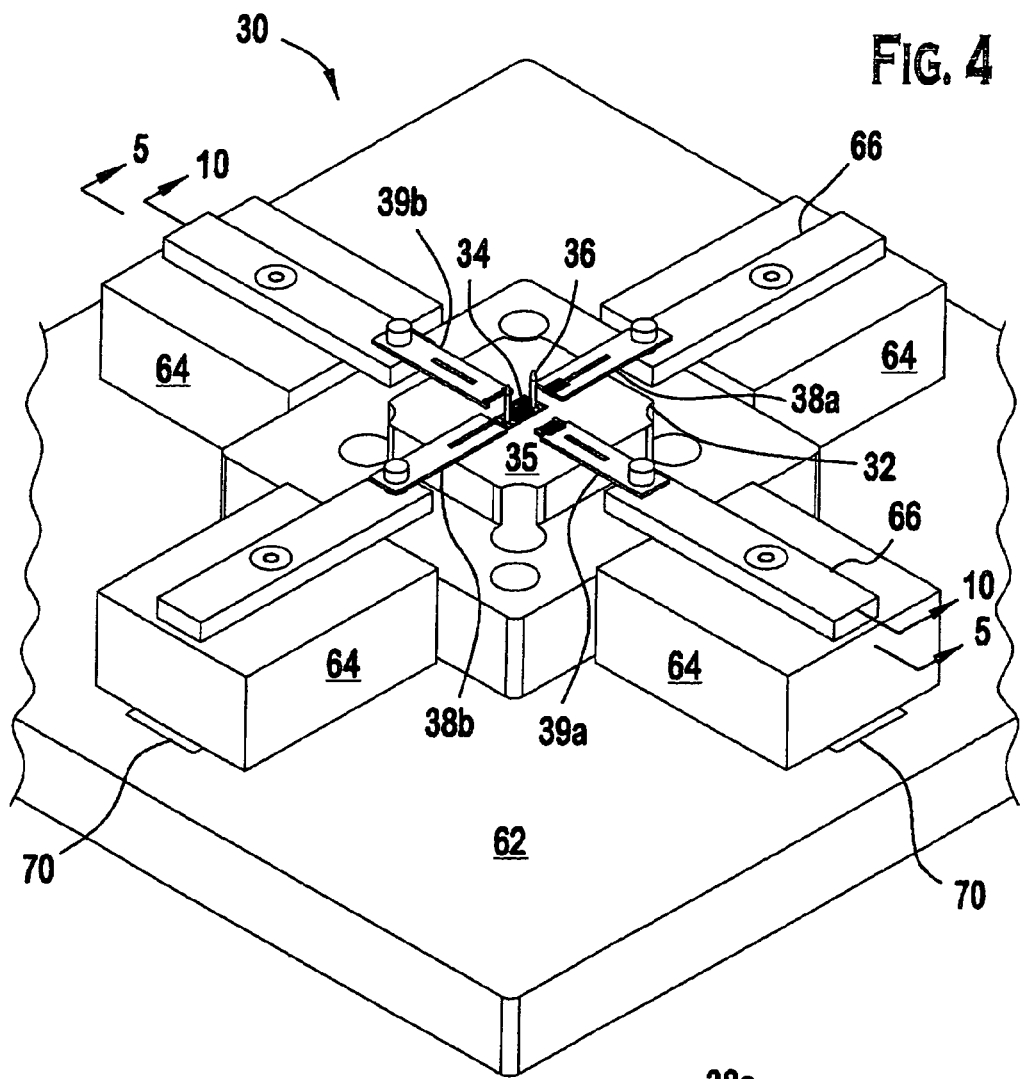
FIG. 4 is a perspective view of an assembly tool for assembling the array ferrule of FIG. 1.
Figure 6:
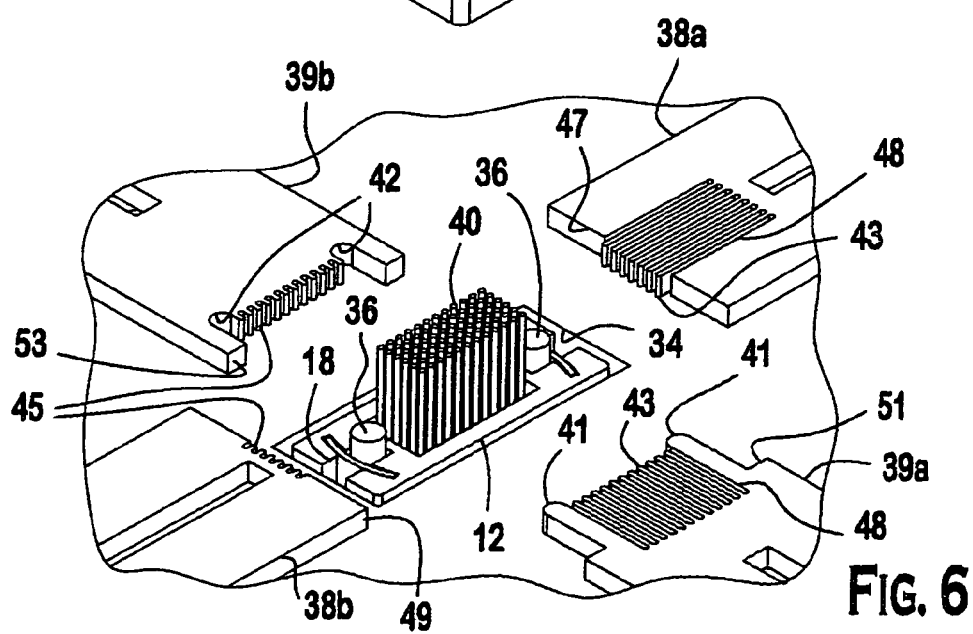
FIG. 6 is a partially exploded perspective view of the central portion of the tool shown in FIG. 4.
Figure 5:
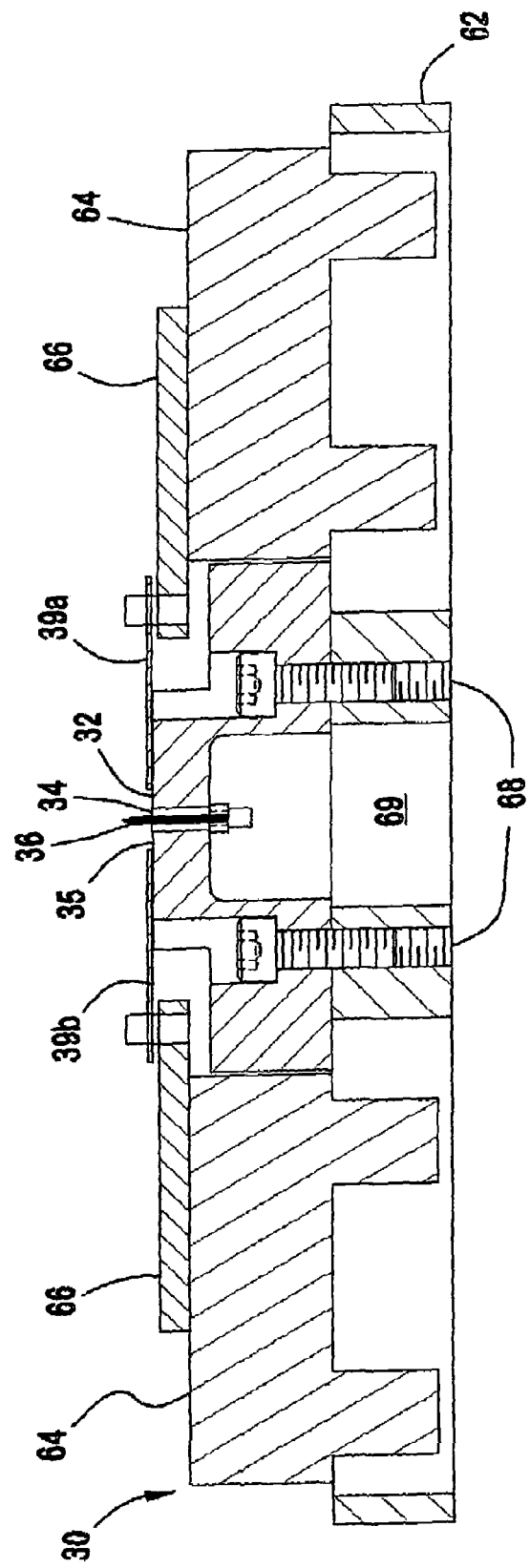
FIG. 5 is a cross sectional view taken along the line 5—5 of FIG. 4.

An assembly tool 30 will now be described in greater detail with reference to FIGS. 4–6. Referring first to FIGS. 4 and 5, a table 62 has a central opening 69 passing between its major surfaces in a central region. A central fixture 32 is located over the central opening 69 and is mounted to the table 62 by suitable fasteners 68. The central fixture 32 has a pair of locating pins 36 mounted within a ferrule receiving opening 34. Guide slots 70 are provided along a major surface and extend outward from the central opening 69. Comb mounts 64 are positioned over and are movable within the guide slots 70. A comb holder 66 is mounted on the top of each comb mount 64. A respective comb 38a, 38b, 39a, 39b is mounted to each comb holder 66 utilizing a suitable fastener. The comb mounts 64 are slidable toward and away the locating pins 36 such that the combs 38a, 38b, 39a, 39b slide along a top surface 35 of the central fixture 32. Guide projections 63 extend downward from the comb mounts into the guide slots and are slidingly received therein in order to allow the comb mounts 64 to move in a controlled linear motion toward and away from the locating pins 36.

The combs 38a, 38b, 39a, 39b will now be described in greater detail with reference to FIG. 6. The combs 38a, 38b, 39a, 39b are each formed of a sheet material having a thickness which is preferably a multiple of the optical fiber diameter. For example, this multiple may be five times or greater in order to accurately position the optical fibers 40 to be orthogonal to the mating face 14 as will be described below. The comb 38a has a plurality of long teeth 43 extending towards and slightly beyond an end 47 to form a fiber receiving area 48 having a plurality of spaces between the long teeth 43. The comb 38b is similarly formed of a sheet material and has a plurality of short teeth 45 extending outward to a complementary end 49 which is profiled to mate with the end 47. The short teeth 45 interlock between the spaces formed by ends of the long teeth 43 which project beyond the end 47. The comb 39a is oriented orthogonal to the combs 38a, 38b and is similarly formed of a sheet material and features a plurality of long teeth 43 extending outward to form a similar fiber receiving area 48. A pair of alignment tabs 41 also extend outward slightly beyond the free ends of the long teeth 43. Each alignment tab 41 has a semi-circular free end. The alignment tabs 41 extend outwardly from a respective reference surface 51 formed along the outside of each alignment tab 41. The comb 39b is similarly formed of a sheet material and features a plurality of short teeth 45 being profiled to interlock in the space formed by the free ends of the long teeth 43 on the comb 39a. A pair of alignment recesses 42 are formed to be complementary to the semi-circular free ends of the alignment tabs 41. A second reference surface 53 is provided on the outside of each alignment recess 42.

In assembly, the formed main body 12 is placed within the ferrule receiving opening 34 such that the locating pins 36 are positioned within the pin slots 18 in order to precisely locate the fiber receiving cavity 22 with respect to the combs 38a, 38b, 39a, 39b. The optical fibers 40 are then positioned within the fiber receiving cavity 22 as best shown in FIGS. 6 and 3.

Figure 7:
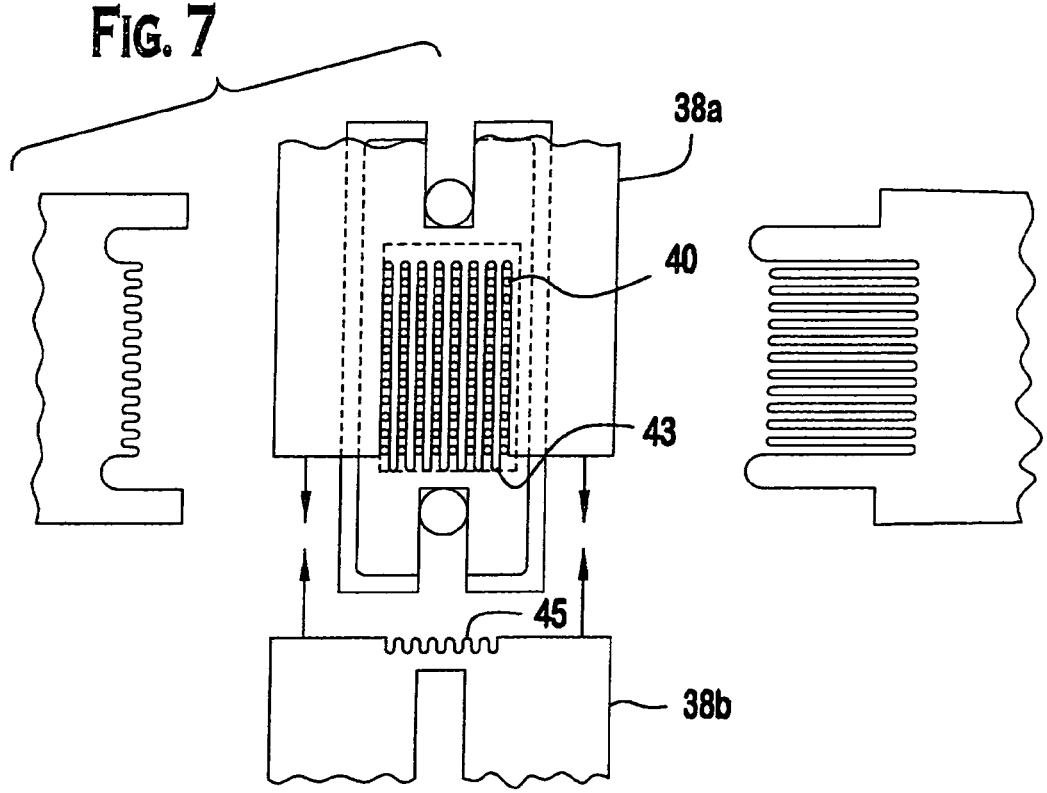
FIG. 7 is a top view of the central portion of the tool in FIG. 4 in the first step of a progression which accurately positions the fibers within the fiber receiving cavity of the ferrule.
Figure 8:
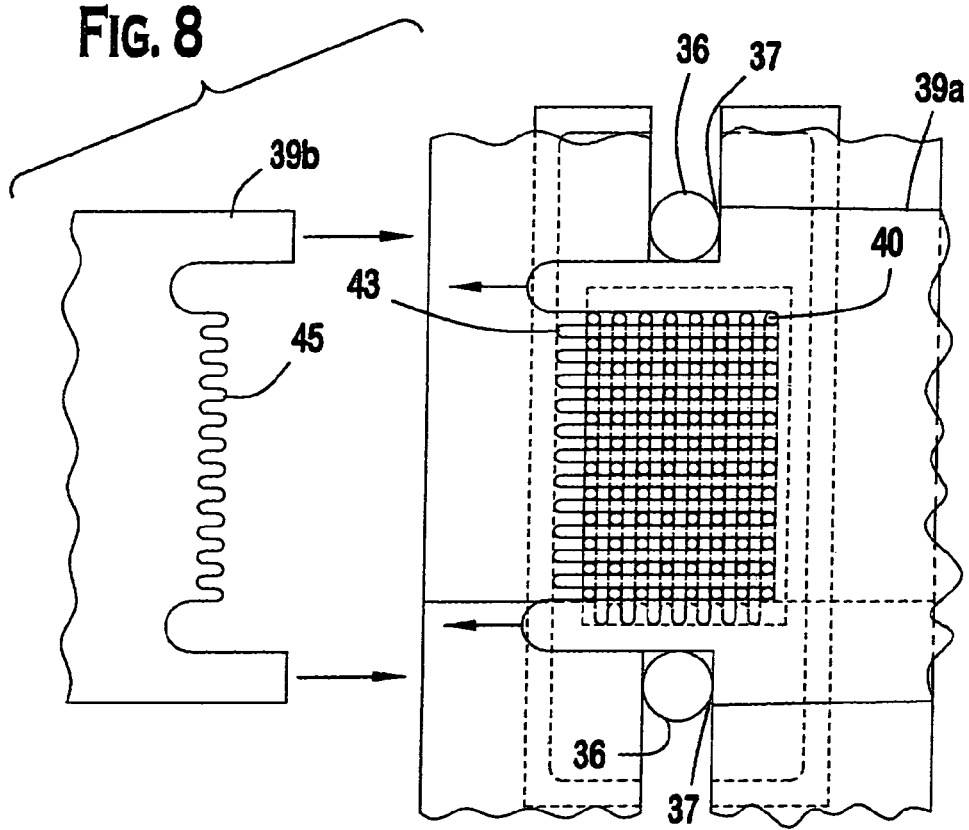
FIG. 8 is a top view of the central portion of the tool in FIG. 4 in the second step of a progression which accurately positions the fibers within the fiber receiving cavity of the ferrule.
Figure 9:
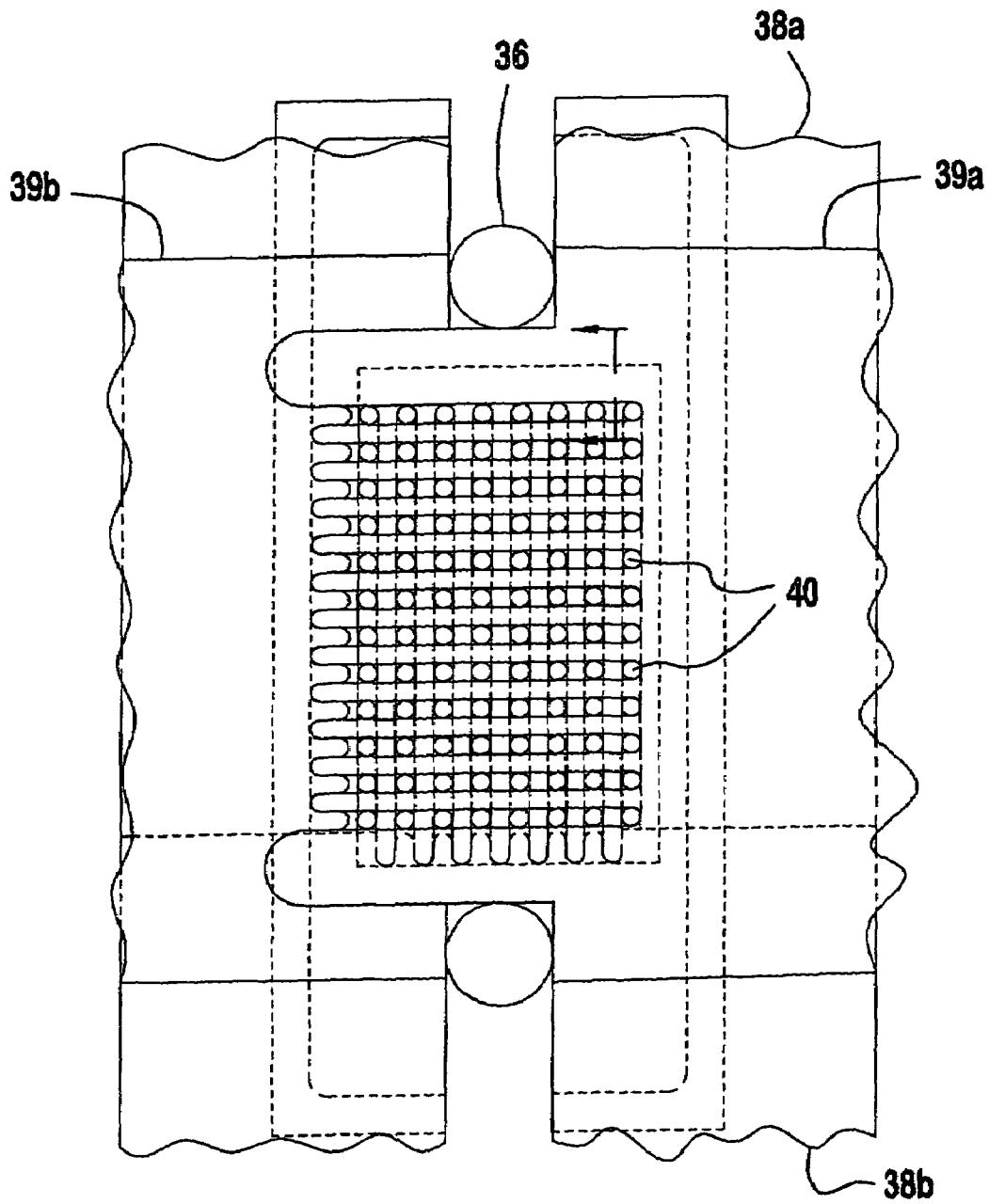
FIG. 9 is a top view of the central portion of the tool in FIG. 4 in the final step of a progression which accurately positions the fibers within the fiber receiving cavity of the ferrule.
Figure 10:
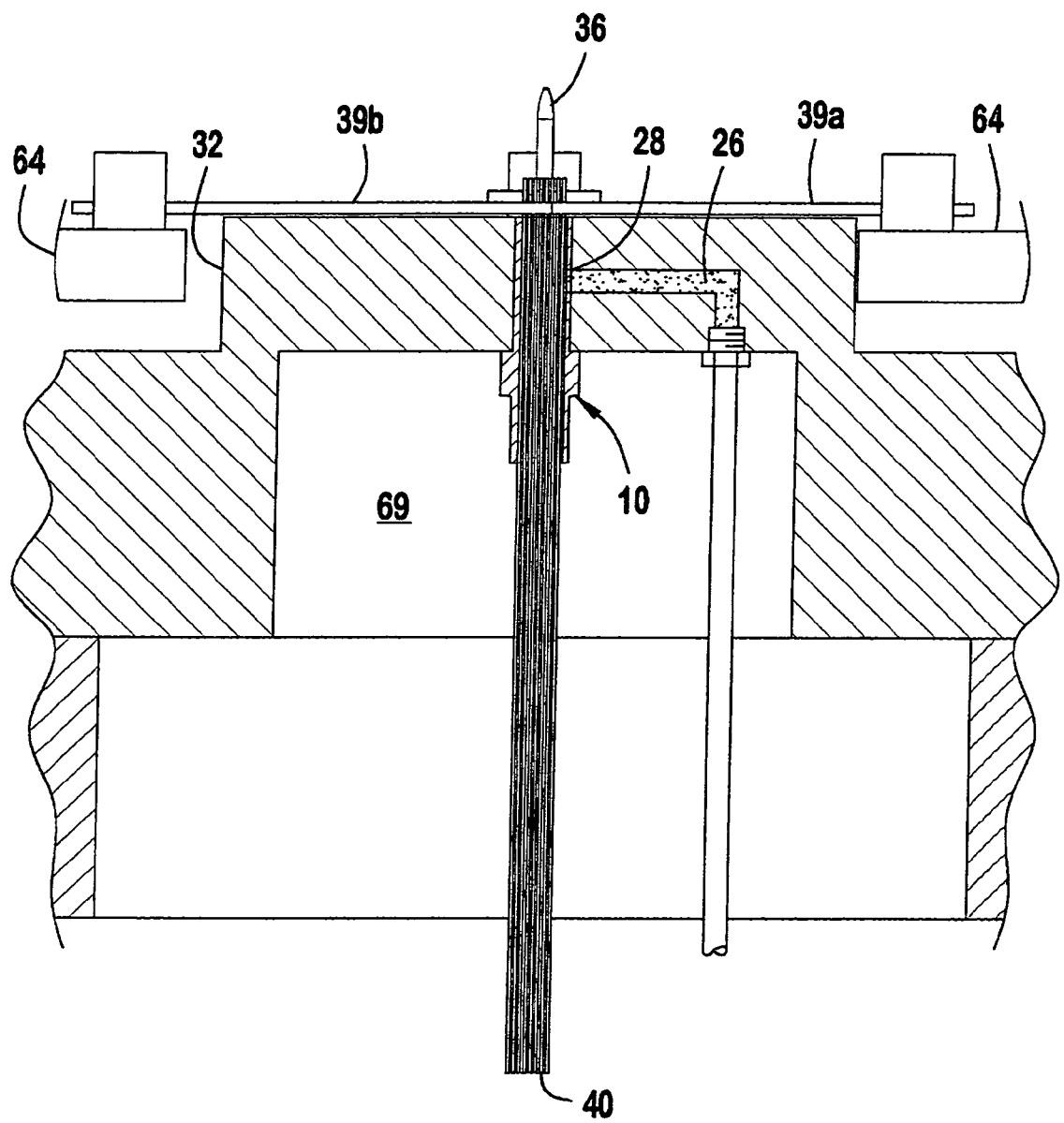
FIG. 10 is a partial cross sectional view taken along the line 10—10 of FIG. 4.

Alignment of the optical fibers 40 within the fiber receiving cavity 22 will be described in greater detail with reference to FIG. 6 and the progression shown in FIGS. 7–9. Referring first to FIG. 7, once the optical fibers 40 are roughly aligned within the fiber receiving cavity 22, the combs 38a and 38b are moved in the direction shown by the arrows in FIG. 7 by sliding the comb mounts 64 within the guide slots 70 such that the plurality of optical fibers 40 are aligned in between the interlocking long and short teeth 43, 45. Next, as shown in FIG. 8, the third and fourth combs 39a and 39b are moved towards each other in the direction shown by the arrows in FIG. 8 such that the optical fibers 40 are positioned between the interlocking long and short teeth 43, 45. Reference surfaces 51, 53 are positioned to engage the locating pins 36 in order to precisely locate the optical fibers 40 with respect to the locating pins 36 and the pin slots 18. Once the optical fibers 40 are precisely positioned within the combs 38a, 38b, 39a, 39b as best shown in FIG. 10, an encapsulant 26 is injected into the passageway 28 (FIG. 1) through an encapsulant supply tube and allowed to cool in order to fix the optical fibers 40 in precise location within the fiber receiving cavity 22. A suitable encapsulant is a metallic material, for example "Cerrocast", available from several metal suppliers, such as Canada Metal. It should be understood that other encapsulants are within the scope of the invention and may be substituted for the metallic encapsulant. The array ferrule 10 is then removed from the ferrule receiving opening 34. The optical fibers 40 are cleaved and the mating face 14 is polished by well known techniques in order to complete the array ferrule 10.

The foregoing illustrates some of the possibilities for practicing the invention. Many other embodiments are possible within the scope and spirit of the invention. For example, the methods of the invention may be used to create various array configurations of fibers in rectangular or other shaped fiber receiving openings. It is, therefore, intended that the foregoing description be regarded as illustrative rather than limiting, and that the scope of the invention is given by the appended claims together with their full range of equivalents.

What is claimed is:

1. An array ferrule for use in a fiber optic connector comprising:

a main body having a pair of opposing side surfaces, a fiber receiving cavity extending therethrough between the opposing side surfaces from a mating face to a rear end, a pair of pin slots being cut inward from the opposing side surfaces and extending adjacent to and precisely located with respect to the fiber receiving cavity, and a retention member slot formed in the main body and extending outward from each pin slot;

a plurality of fibers precisely positioned within the fiber receiving cavity; and, an encapsulant located around the fibers and substantially filling the fiber receiving cavity.

2. The array ferrule of claim 1 further comprising at least one pin located within one of the pin slots.

3. The array ferrule of claim 2 further comprising a retention member being secured within one of the retention member slots and being in engagement with the pin.

4. The array ferrule of claim 1 wherein the encapsulant is a metallic material.

5. The array ferrule of claim 1 further comprising an encapsulant passageway passing from the fiber receiving cavity to an outer surface of the main body.

* * * * *